(12) United States Patent
Waldschmidt

(10) Patent No.: US 9,837,847 B2
(45) Date of Patent: Dec. 5, 2017

(54) WIRELESS CHARGING TRANSMITTER AND METHOD THEREOF

(71) Applicant: LITE-ON TECHNOLOGY CORPORATION, Taipei (TW)

(72) Inventor: Andre Waldschmidt, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 185 days.

(21) Appl. No.: 14/526,431

(22) Filed: Oct. 28, 2014

(65) Prior Publication Data
US 2016/0118836 A1    Apr. 28, 2016

(51) Int. Cl.
| H02J 7/00 | (2006.01) |
| H02J 7/02 | (2016.01) |
| H01Q 9/28 | (2006.01) |
| H01Q 15/24 | (2006.01) |
| H01Q 19/28 | (2006.01) |
| H02J 50/70 | (2016.01) |
| H02J 50/50 | (2016.01) |
| H02J 50/10 | (2016.01) |
| H01Q 21/06 | (2006.01) |
| H02J 50/27 | (2016.01) |

(52) U.S. Cl.
CPC .............. *H02J 7/025* (2013.01); *H01Q 9/285* (2013.01); *H01Q 15/24* (2013.01); *H01Q 19/28* (2013.01); *H01Q 21/062* (2013.01); *H02J 50/10* (2016.02); *H02J 50/50* (2016.02); *H02J 50/70* (2016.02); *H02J 50/27* (2016.02)

(58) Field of Classification Search
CPC .. H02J 7/025; H02J 50/10; H02J 50/12; H02J 50/40; H02J 50/50; H02J 50/60; H02J 50/70; H02J 50/80; H02J 50/90; H02J 17/00; H05K 9/00; H01Q 9/285; H01Q 15/24; H01Q 19/28
USPC .......................................... 320/108; 343/795
See application file for complete search history.

(56) References Cited

U.S. PATENT DOCUMENTS

| 2006/0214867 A1* | 9/2006 | Chen ...................... H01Q 9/285 |
| | | 343/795 |
| 2012/0091993 A1* | 4/2012 | Uramoto ................. H02J 7/025 |
| | | 324/105 |
| 2013/0181535 A1* | 7/2013 | Muratov ................. H01F 38/14 |
| | | 307/104 |

(Continued)

FOREIGN PATENT DOCUMENTS

| EP | 2755296 A1 | 7/2014 |
| JP | 2003-069282 A | 3/2003 |

OTHER PUBLICATIONS

Korean Office Action dated Jul. 8, 2016 with translation.

*Primary Examiner* — Drew A Dunn
*Assistant Examiner* — Michael Dibenedetto
(74) *Attorney, Agent, or Firm* — Rabin & Berdo, P.C.

(57) ABSTRACT

A wireless charging transmitter is provided for charging an electronic device having a receiver coil. The wireless charging transmitter includes a charging module, including a transmitter coil electromagnetically coupled to the receiver coil, and a comb-shaped combination of shielding and planar dipole antenna array. The comb-shaped combination of shielding and planar dipole antenna array includes a plurality of dipole antennas; each of the dipole antennas includes a plurality of comb-like antenna portions.

20 Claims, 4 Drawing Sheets

(56) References Cited

U.S. PATENT DOCUMENTS

| | | | | |
|---|---|---|---|---|
| 2013/0257366 A1* | 10/2013 | Scholz | ............ | H05K 9/00 320/108 |
| 2013/0288600 A1* | 10/2013 | Kuusilinna | ......... | H02J 7/0004 455/41.2 |
| 2014/0070763 A1* | 3/2014 | Chiles | ............ | H01F 38/14 320/108 |
| 2016/0204832 A1* | 7/2016 | Holz | ......... | H01Q 1/48 455/41.1 |

\* cited by examiner

WIRELESS CHARGING TRANSMITTER AND METHOD THEREOF

TECHNICAL FIELD

The present invention is related to a wireless charging transmitter and in particular, to a wireless charging transmitter with combined faraday shield and dipole antenna array.

BACKGROUND

Electronic device are usually charged by connecting a charging device via a cord or charged by a rechargeable battery inside the electronic device to provide necessary electricity. But, the cored charging method will suffer the inconveniences caused by the limited length of the charging cords.

Thus, inductive charging (also referred as wireless charging), which is implemented through electromagnetic induction, becomes popular for the electronic device. A wireless power transmission system transfers electrical power from transmitter to receiver without any wire/cord connection.

However, electromagnetic interference (EMI) is a major problem which degrades the performance of the electronic device. Non-directed electromagnetic radiation from the wireless charging transmitter might have a possibility of influencing other neighbor electronic devices, which leads a high risk and safety threat.

Thus, there is a need provide a wireless charging transmitter which uses a comb-structured shielding and planar dipole antenna array for mobile antenna coupling and faraday shield (EMC improvement).

SUMMARY

The present invention is directed to a wireless charging transmitter having combined functions of EMI filtering and antenna coupling provided by a comb-shaped combination of shielding and planar dipole antenna array.

According to one embodiment of the present invention, a wireless charging transmitter is provided for charging an electronic device having a receiver coil. The wireless charging transmitter includes a charging module including a transmitter coil electromagnetically coupled to the receiver coil, and a comb-shaped combination of shielding and planar dipole antenna array. The comb-shaped combination of shielding and planar dipole antenna array includes a plurality of dipole antennas, and each of the dipole antennas includes a plurality of comb-like antenna portions.

According to another embodiment of the present invention, a wireless charging method applicable to a wireless charging transmitter is provided. The method includes: wireless coupling a comb-shaped combination of shielding and planar dipole antenna array of the wireless charging transmitter to an antenna of the electronic device for receiving a mobile communication signal from the electronic device; and wireless charging the electronic device by a transmitter coil of the wireless charging transmitter. The comb-shaped combination of shielding and planar dipole antenna array includes a plurality of dipole antennas, and each of the dipole antennas includes a plurality of comb-like antenna portions.

Figure 1:
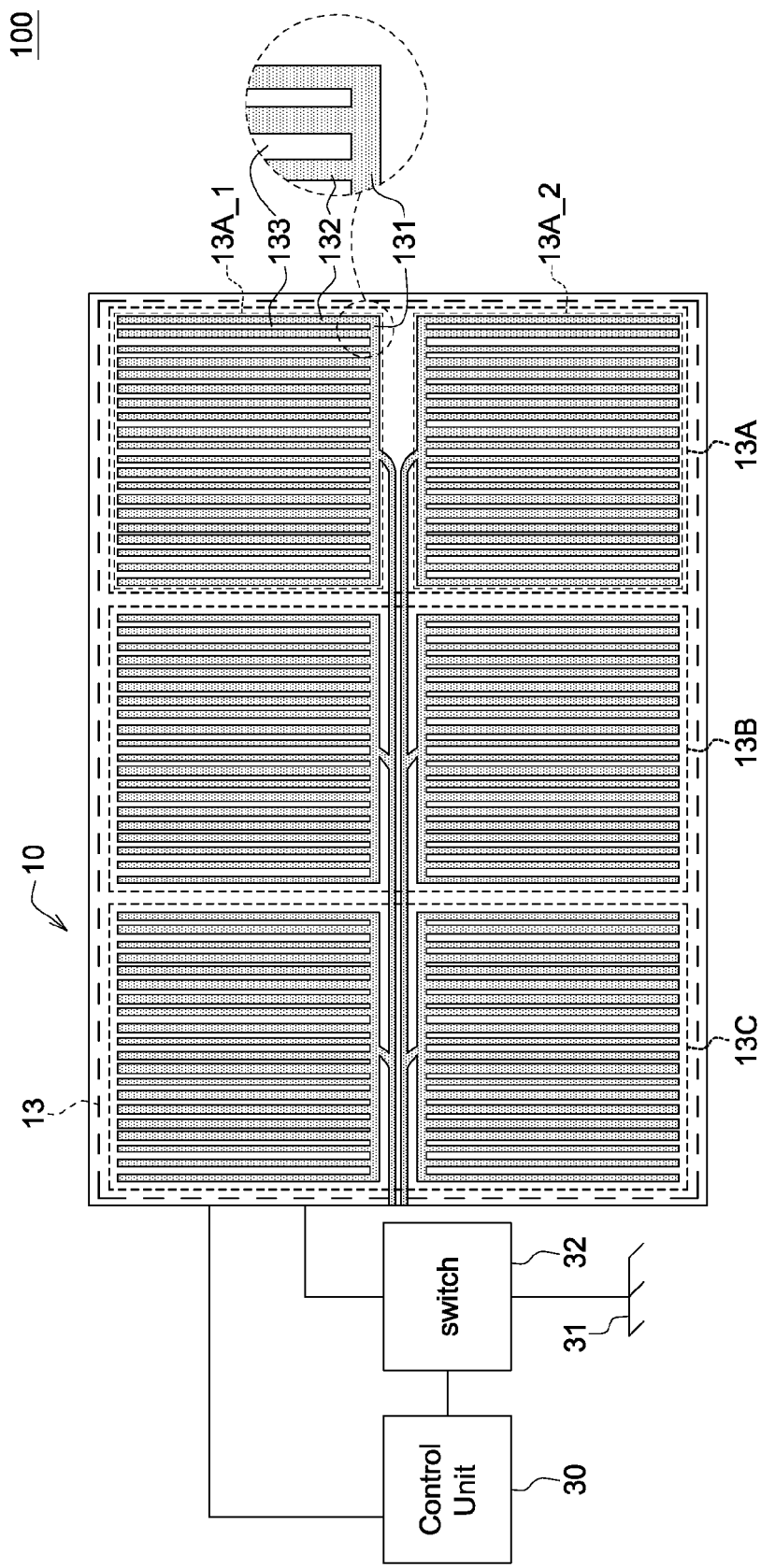
FIG. 1 shows a comb-shaped combination of shielding and planar dipole antenna array of a wireless charging transmitter according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the present invention are based on general definition in the technical field of the present invention. If the present invention describes or explains one or some terms, definition of the terms is based on the description or explanation of the present invention. In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

Figure 2:
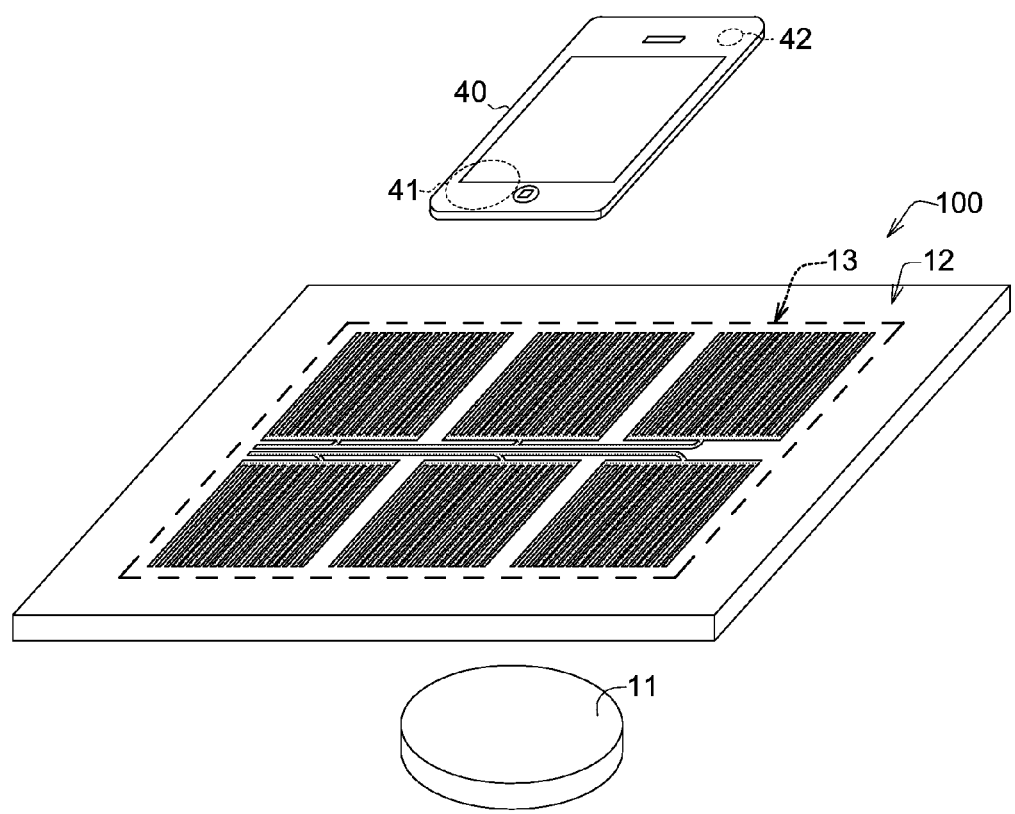
FIG. 2 shows the wireless charging transmitter having the comb-shaped combination of shielding and planar dipole antenna array according to the embodiment of the present invention and an electronic device to be wireless charged by the wireless charging transmitter.

FIG. 1 shows comb-shaped combination of shielding and planar dipole antenna array of a wireless charging transmitter of an embodiment of the present invention. FIG. 2 shows the wireless charging transmitter having the comb-shaped combination of shielding and planar dipole antenna array according to the embodiment of the present invention and an electronic device 40. The wireless charging transmitter 100 may be used for charging the electronic device 40 wirelessly.

Now refer to FIG. 1 and FIG. 2. The wireless charging transmitter 100 includes a charging module 10 and a control unit 30. The charging module 10 includes at least one transmitter coil (or said, a primary coil) 11, a placing area 12 and a comb-shaped combination of shielding and planar dipole antenna array 13. The transmitter coil 11 is electromagnetically coupled to a receiver coil (or said, a secondary coil) 41 configured in the electronic device 40, and may be coupled to a power supply (not shown) for power converting. The transmitter coil 11 may be integrated into a substrate (for example, a PCB (printed circuit board)) of the wireless charging transmitter 100. In wireless charging, the electronic device 40 may be placed on the placing area 12 of the charging module 10. The wireless charging transmitter 100 may further include an additional component (not shown) for detecting whether an object (for example, the electronic device 40) approaches the wireless charging transmitter 100. Details of how to detect whether the object approaches the wireless charging transmitter 100 may be skipped in the description of the present invention.

In general, the electronic device 40 may include the receiver coil 41 and an antenna 42. In wireless charging, the receiver coil 41 may induce the electromagnetic field generated by the transmitter coil 11 of the wireless charging transmitter 100 and convert into an electrical current to charge the battery (not shown) in the electronic device 40 or to provide power for the operations of the electronic device 40.

In the embodiment of the present invention, the wireless charging transmitter 100 may have two modes, namely, a standby mode and a charging mode. In the standby mode, the wireless charging transmitter 100 may detect whether an object approaches within a predetermined radius of the wireless charging transmitter 100. In the charging mode, the comb-shaped combination of shielding and planar dipole antenna array 13 is for electric radiation shielding and for coupling with the antenna 42 of the electronic device 40. Thus, a combined electric radiation shielding and antenna coupling functions are provided by the comb-shaped combination of shielding and planar dipole antenna array 13. The switching of the two modes will discuss below.

Besides, the comb-shaped combination of shielding and planar dipole antenna array 13 may act as an EMI filter for shielding and reducing E-field radiation emission from the transmitter coil 11 in wireless charging. However, the H-field (the magnetic field) from the transmitter coil 11, which is used for wireless charging the electronic device 40, is not shielded by the comb-shaped combination of shielding and planar dipole antenna array 13.

The control unit 30 is coupled to the comb-shaped combination of shielding and planar dipole antenna array 13. The control unit 30 may switch the charging module 100 from the standby mode to the charging mode to wireless charge the electronic device 40 if the wireless charging transmitter detects that the object (for example, the electronic device) approaches within a predetermined radius of the wireless charging transmitter 100.

In communication, the control unit 30 may send a ping signal to the electronic device 40, for example via the transmitter coil 11. Thus, the electronic device 40 may switch a modulation capacitor (not shown) or a resistor (not shown) to the ping signal. This modulation information in the magnetic field from the electronic device 40 may be demodulated by the transmitter demodulator (not shown) of the wireless charging transmitter 100 to determine that the electronic device 40 is to be charged. After demodulation, the wireless charging transmitter 100 may determine to wireless charge the object approaching within the predetermined radius.

In the charging mode, the charging status of the battery is reported by the electronic device 40 to the wireless charging transmitter 100. The modulated information from the wireless power receiver in the electronic device 40 is in the magnetic field of pinging and charging. Further, in pinging, in the standby mode and in the charging mode, the comb-shaped combination of shielding and planar dipole antenna array 13 acts like an antenna and is coupled to the electronic device 40 for receiving the mobile communication signal from the electronic device 40.

Further, in the embodiment of the present invention, the comb-shaped combination of shielding and planar dipole antenna array 13 may include three dipole antennas 13A~13C. In the embodiment, the three dipole antennas 13A~13C may have the same or similar antenna configuration. The dipole antenna 13A includes two antenna portions 13A_1 and 13A_2. Each of the antenna portions 13A_1 and 13A_2 of the dipole antenna 13A includes a comb base 131 and a plurality of parallel tracks 132. Spaces 133 are arranged between the adjacent tracks 132. All tracks 132 are connected to the comb base 131. As shown in FIG. 1, the structure of the antenna portion 13A_1 and 13A_2 is in a comb-like shape. Further, although in FIG. 1, the tracks 132 are vertical to the comb base 131, other directions are also applicable. The dipole antennas 13A~13C may have other possible positions and other possible directions, which are still within the scope and spirit of the present invention. The comb-shaped combination of shielding and planar dipole antenna array 13 is made of a layer of conductive material. Further, the comb-shaped combination of shielding and planar dipole antenna array 13 may be printed on the carrier of the wireless charging transmitter 100.

The dipole antennas 13A~13C are wireless coupled with the antenna 42 of the electronic device 40. The dipole antennas 13A~13C are wireless coupled to the antenna 42 of the electronic device 40 at the mobile communication frequencies (for example but not limited by, 850 MHz~2.7 GHz or 800 MHz~2.5 GHz).

The substrate (or the carrier) of the wireless charging transmitter 100 may be a PCB. In possible implementations, other carrier materials like foils may be used.

In the description of the embodiment of the present invention, the term "wireless charging," also called "inductive charging," refers to use an electromagnetic field to transfer energy from the wireless charging transmitter 100 to the electronic device 40. Energy is sent from the transmitter coil 11 of the wireless charging transmitter 100 through inductive coupling to the receiver coil 41 of the electronic device 40; and then the electronic device 40 may use the energy to charge a battery (not shown) in the electronic device 40 or run the electronic device 40.

Typically, for wireless charging, the wireless charging transmitter 100 uses the transmitter coil 11 as an induction coil to couple to an alternating current (AC) power supply (not shown) and to create an alternating electromagnetic field, and the receiver coil 41 in the electronic device 40 takes power from the electromagnetic field and converts it into electrical current to charge the battery (not shown) of the electronic device 40. The two induction coils 11, 41 in proximity combine to form a loose coupled electrical transformer.

In wireless charging (in charging mode), the H-fields (magnetic fields) from the transmitter coil 11 charge the electronic device 40, but the transmitter coil 11 of the wireless charging transmitter 100 also transmits E-fields (electric fields). The E-fields may disturb other devices nearby the wireless charging transmitter 100. The comb-shaped combination of shielding and planar dipole antenna array 13 is used as an EMI filter to shield the electric radiation from E-fields (when the wireless charging transmitter 100 is in the charging mode), but does not shield the inductive magnetic (H-fields) coupling to the electronic device 40. In addition, the control unit 30 switches the comb-shaped combination of shielding and planar dipole antenna array 13 to be coupled to the ground 31, and thus, the radiated emission is reduced. If the object approaching the wireless charging transmitter 100 does not respond to the ping signal, the control unit 30 keeps the wireless charging transmitter 100 in the standby mode. The control unit 30 may further comprise a switch 32, which is electrically coupled between the ground 31 and the comb-shaped combination of shielding and planar dipole antenna array 13.

The comb-shaped combination of shielding and planar dipole antenna array 13 is also called as a Faraday shield. The comb-shaped combination of shielding and planar dipole antenna array 13 may be made from a metal sheet or foils or other materials that are suitable for shielding.

As a preferable embodiment, the comb-shaped combination of shielding and planar dipole antenna array 13 may be printed on a PCB board, to strengthen the structure or to reduce the use of the metal materials. The comb-shaped combination of shielding and planar dipole antenna array 13 may cover the transmitter coil 11.

Figure 3A:
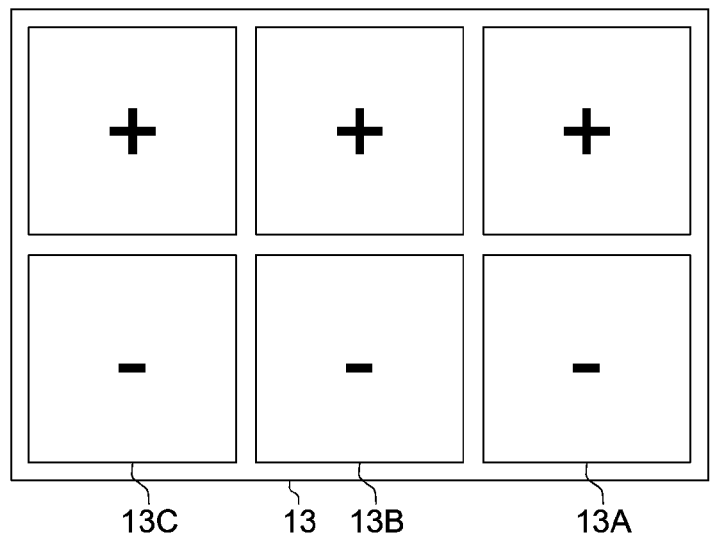
FIGS. 3A and 3B show two possible implementations of the comb-shaped combination of shielding and planar dipole antenna array according the embodiment of the present invention.
Figure 3B:
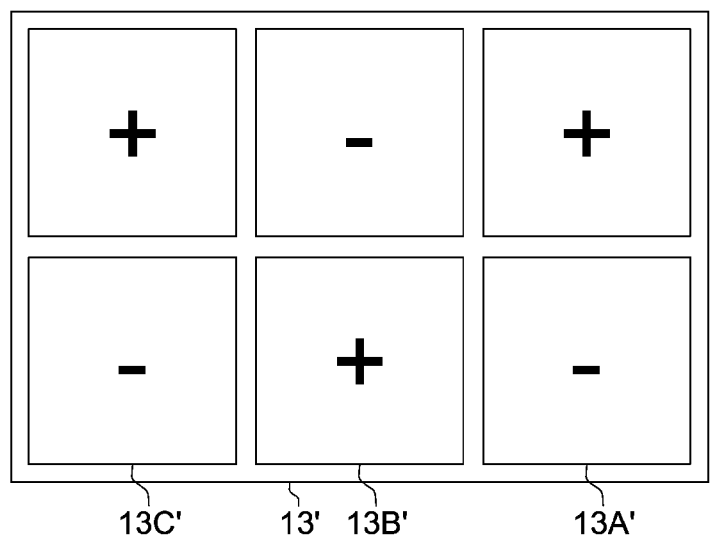

FIGS. 3A and 3B show two possible implementations of the comb-shaped combination of shielding and planar dipole antenna array according the embodiment of the present invention. The symbols "+" and "−" refer to the polarity of the dipole antennas. The dipole antennas 13A~13C in FIG. 3A are used in the comb-shaped combination of shielding and planar dipole antenna array 13 of FIG. 1 and FIG. 2. As shown in FIG. 3B, the dipole antennas 13A'~13C' in the comb-shaped combination of shielding and planar dipole antenna array 13' have different polarity arrangement from the dipole antennas 13A~13C in the comb-shaped combination of shielding and planar dipole antenna array 13. However, the comb-shaped combination of shielding and planar dipole antenna array 13' has the same or similar functions with the comb-shaped combination of shielding and planar dipole antenna array 13.

Figure 4:
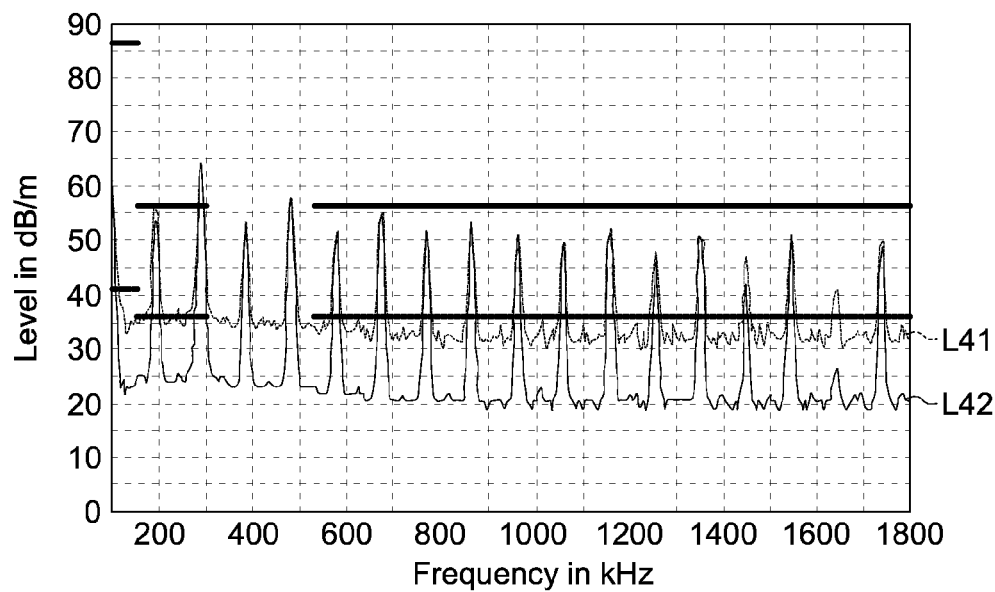
FIG. 4 shows the electric radiation emitted from a wireless charging transmitter in a charging mode without the comb-shaped combination of shielding and planar dipole antenna array.
Figure 5:
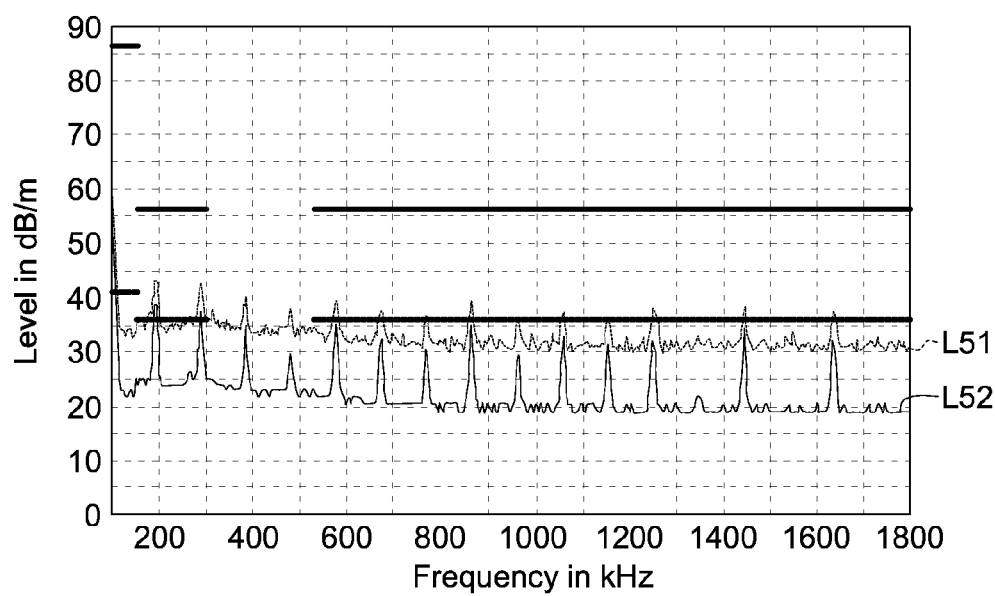
FIG. 5 shows the electric radiation emitted from a wireless charging transmitter in a charging mode with the comb-shaped combination of shielding and planar dipole antenna array of the embodiment of the present invention.

The shielding ability of a wireless charging transmitter with and without the comb-shaped combination of shielding and planar dipole antenna array are compared. FIG. 4 shows the electric radiation emitted from a wireless charging transmitter in a charging mode without the comb-shaped combination of shielding and planar dipole antenna array. FIG. 5 shows the electric radiation emitted from a wireless charging transmitter in a charging mode with the comb-shaped combination of shielding and planar dipole antenna array of the embodiment of the present invention. The lines L41 and L51 in both figures refer to peak detector trace; and the lines L42 and L52 in both figures refer to average detector trace. As can be seen from FIG. 4, the electric radiation is significantly above the standard, whereas there are a few peaks breaking out the standard in FIG. 5. It is proved that the design of the embodiment of the present invention surely can reduce the radiation emission of the E-fields.

The wireless charging transmitter of the embodiment of the present invention is suitable for various different industries, for example, automotive industry, home appliances, consumer electronics, medical systems.

It will be apparent to those skilled in the art that various modifications and variations can be made to the disclosed embodiments. It is intended that the specification and examples be considered as exemplary only, with a true scope of the present invention being indicated by the following claims and their equivalents.

What is claimed is:

1. A wireless charging transmitter for charging an electronic device having a receiver coil, comprising:
   a charging module, comprising a transmitter coil electromagnetically coupled to the receiver coil, and an array of comb-shaped structures with combined electric radiation shielding and antenna coupling functions; and
   a control unit coupled to the array of comb-shaped structures for switching the charging module from a standby mode to a charging mode to wirelessly charge the electronic device;
   wherein the array includes a plurality of planar dipole antennas, and each of the planar dipole antennas includes a plurality of comb-like antenna portions,
   wherein, in the standby mode, the planar dipole antennas wirelessly couple with an antenna of the electronic device for receiving a mobile communication signal from the electronic device, and the charging module determines whether the electronic device is to be charged by the transmitter coil through the mobile communication signal when the electronic device approaches within a predetermined radius of the wireless charging transmitter, and
   wherein, in the charging mode, the planar dipole antennas operate for electric radiation shielding and for coupling with the antenna of the electronic device.

2. The wireless charging transmitter as claimed in claim 1, wherein each of the antenna portions includes a comb base, and a plurality of parallel tracks connected to the comb base.

3. The wireless charging transmitter as claimed in claim 2, wherein:
   an electric field produced by the transmitter coil is shielded by the array in the charging mode;
   the array enables a magnetic field produced by the transmitter coil to be inductively coupled to the receiver coil; and
   the magnetic field produced by the transmitter coil crosses through the array of comb-shaped structures.

4. The wireless charging transmitter of claim 1, wherein
   the mobile communication signal transmitted from the electronic device is received by the array of comb-shaped structures; and
   in pinging, modulation information of the mobile communication signal from the electronic device is demodulated by the wireless charging transmitter and thus the wireless charging transmitter demodulates the modulation information to determine whether the electronic device is to be charged by the wireless charging transmitter.

5. The wireless charging transmitter as claimed in claim 1, wherein, in pinging, the control unit sends a ping signal to the electronic device via the transmitter coil, and the electronic device responds to the ping signal for charging.

6. The wireless charging transmitter as claimed in claim 5, wherein the control unit further comprises a switch, the switch is controlled to couple the array of comb-shaped structures to ground when the wireless charging transmitter is in the charging mode, and if the electronic device while approaching the wireless charging transmitter does not respond to the ping signal, the control unit keeps the wireless charging transmitter in the standby mode.

7. The wireless charging transmitter as claimed in claim 1, wherein the planar dipole antennas are coupled and arranged on a plane.

8. The wireless charging transmitter as claimed in claim 7, wherein the plurality of planar dipole antennas are three dipole antennas, each having a different polarity arrangement from an adjacent one.

9. A wireless charging method applicable to a wireless charging transmitter, the wireless charging method including:
   wirelessly coupling an array of comb-shaped structures with combined electric radiation shielding and antenna coupling functions of the wireless charging transmitter to an antenna of an electronic device for receiving a mobile communication signal from the electronic device when the wireless charging transmitter is in a standby mode;

determining whether the electronic device is to be charged by a transmitter coil of the wireless charging transmitter through the mobile communication signal when the electronic device approaches within a predetermined radius of the wireless charging transmitter, and if so, switching the wireless charging transmitter from the standby mode to a charging mode to wirelessly charge the electronic device;

wherein an electric field produced by the transmitter coil is shielded by the array of comb-shaped structures in wireless charging; and wherein the array includes a plurality of planar dipole antennas, and each of the planar dipole antennas includes a plurality of comb-like antenna portions.

10. The wireless charging method of claim 9, wherein each of the antenna portions includes a comb base, and a plurality of parallel tracks connected to the comb base.

11. The wireless charging method of claim 10, further comprising:

enabling the transmitter coil to be inductively coupled to a receiver coil of the electronic device; and crossing a magnetic field from the transmitter coil through the array.

12. The wireless charging method of claim 9, wherein said determining includes:

sending a ping signal from a control unit coupled to the array of comb-shaped structures via the transmitter coil;

receiving the mobile communication signal transmitted from the electronic device by the array of comb-shaped structures; and in pinging, demodulating modulation information of the mobile communication signal from the electronic device to determine whether the electronic device is to be charged by the wireless charging transmitter.

13. The wireless charging method as claimed in claim 12, wherein the control unit further comprises a switch, the switch is controlled to couple the array of comb-shaped structure to ground when the wireless charging transmitter is in the charging mode, and if the electronic device approaching the wireless charging transmitter does not respond to the ping signal, the control unit keeps the wireless charging transmitter in the standby mode.

14. The wireless charging method as claimed in claim 12, wherein the planar dipole antennas are coupled and arranged on a plane.

15. The wireless charging method as claimed in claim 14, wherein the plurality of planar dipole antennas are three dipole antennas, each having a different polarity arrangement from an adjacent one.

16. A wireless charging transmitter for charging an electronic device having a receiver coil, comprising:

a charging module, including a transmitter coil electromagnetically coupled to the receiver coil, and an array of comb-shaped structures with combined electric radiation shielding and antenna coupling functions; and wherein the array includes a plurality of planar dipole antennas, and each of the planar dipole antennas includes a plurality of comb-like antenna portions, wherein, in pinging, the wireless charging transmitter sends a ping signal via the transmitter coil, and detects whether the electronic device responds to the ping signal, and wherein the planar dipole antennas of the wireless charging transmitter wirelessly couple an antenna of the electronic device for receiving a mobile communication signal from the electronic device, and the charging module determines whether the electronic device is to be charged by the transmitter coil through the mobile communication signal when the electronic device approaches within a predetermined radius of the wireless charging transmitter, wherein the planar dipole antennas of the wireless charging transmitter operate for electric radiation shielding and for coupling with the antenna of the electronic device when charging the electronic device.

17. The wireless charging transmitter as claimed in claim 16, wherein the wireless charging transmitter comprises a control unit coupled to the array of comb-shaped structures for switching the charging module from a standby mode to a charging mode to wirelessly charge the electronic device.

18. The wireless charging transmitter as claimed in claim 17, wherein the control unit further comprises a switch, the switch is controlled to couple the array of comb-shaped structure to ground when the wireless charging transmitter is in the charging mode, and if the electronic device while approaching the wireless charging transmitter does not respond to the ping signal, the control unit keeps the wireless charging transmitter in the standby mode.

19. The wireless charging transmitter as claimed in claim 16, wherein the planar dipole antennas are coupled and arranged on a plane.

20. The wireless charging transmitter as claimed in claim 19, wherein the plurality of planar dipole antennas are three dipole antennas, each having a different polarity arrangement from an adjacent one.

* * * * *